United States Patent [19]

Moriya et al.

[11] Patent Number: 4,896,208
[45] Date of Patent: Jan. 23, 1990

[54] APPARATUS AND METHOD FOR READING AND DIGITALLY EDITING MULTIPLE IMAGES

[75] Inventors: Shigeru Moriya; Masamichi Kishi, both of Aichi, Japan

[73] Assignee: Minolta Camera Kabushiki Kaisha, Osaka, Japan

[21] Appl. No.: 127,068

[22] Filed: Dec. 1, 1987

[30] Foreign Application Priority Data

Dec. 2, 1986 [JP] Japan ................................. 61-289461
Dec. 2, 1986 [JP] Japan ................................. 61-289462

[51] Int. Cl.$^4$ ..................... H04N 1/387; H04N 1/21; H04N 1/46
[52] U.S. Cl. ........................................ 358/78; 358/75; 358/450; 358/452; 358/453
[58] Field of Search ................... 358/75, 78, 256, 280, 358/448, 450, 452, 453

[56] References Cited

U.S. PATENT DOCUMENTS

| 4,538,182 | 8/1985 | Saito et al. | 358/280 |
| 4,644,391 | 2/1987 | Shibuya et al. | 358/280 |
| 4,644,392 | 2/1987 | Yamada | 358/75 |
| 4,750,044 | 6/1988 | Nakajima | 358/456 |
| 4,775,886 | 10/1988 | Hirosawa | 358/75 |

FOREIGN PATENT DOCUMENTS

| 57-61372 | 4/1982 | Japan | 358/280 |
| 58-186264 | 10/1983 | Japan | 358/75 |
| 58-200665 | 11/1983 | Japan | 358/280 |
| 58-60875 | 4/1985 | Japan . | |
| 60-246153 | 12/1985 | Japan | 358/280 |
| 61-63157 | 4/1986 | Japan . | |
| 61-63158 | 4/1986 | Japan . | |
| 62-120777 | 6/1987 | Japan . | |
| 62-181570 | 8/1987 | Japan . | |
| 2165678 | 4/1986 | United Kingdom | 358/78 |

Primary Examiner—James J. Groody
Assistant Examiner—Randall S. Svihla
Attorney, Agent, or Firm—Price, Gess & Ubell

[57] ABSTRACT

An image reading and editing apparatus utilizing: a CCD for reading an image signal concerning light intensity of an image of an original, an attribute memory storing attribute data for defining how the image data is to be processed, said attribute data being set for each small section by which an entire image region of the original is divided, an operation panel for designating an arbitrary small area out of the entire image region and setting attribute data for each of the small sections, an image data processing circuit for outputting the image signal based on the stored attribute data, and an external output apparatus for composing a plurality of images based on the outputted image signal to form a composite image.

16 Claims, 10 Drawing Sheets

ORIGINAL a

ORIGINAL b

APPARATUS AND METHOD FOR READING AND DIGITALLY EDITING MULTIPLE IMAGES

BACKGROUND OF THE INVENTION

1. Field of the Invention

The present invention relates to an image reading and editing apparatus having a composite image forming function and particularly to a color image reading and editing apparatus to be used in association with a digital printer or an output memory device.

2. Description of the Prior Art

A conventional digital image processing apparatus for processing an image by digital data comprises an image reader for reading an image of an original and outputting digital data of the image, and a digital printer for printing an image based on the digital image data.

Such a conventional digital image processing apparatus is capable of easily performing various editing operations such as trimming or masking of an image, or composite image formation, since images are processed in the form of digital data.

Such a conventional digital image processing apparatus having the above described advantages performs image editing operations in the below described manner. For example, in order to compose two images separately trimmed from two originals, two image memories are provided. Then, digital data of the two image portions are stored in the respective image memories and a composite image is formed by transferring the data between the two memories. Thus, the two image memories each having a capacity for storing image data of an entire region of one page of the original are required in the above described conventional digital image processing apparatus. Consequently, the apparatus is not economical in view of the manufacturing cost as well as operation efficiency.

Under the circumstances, the assignee of the present invention proposed in Japanese Patent Application No. 61-24836, published as Japanese Kokai No. 62-181570, a monochrome image reader capable of editing images without requiring an image memory for storing image data of entire regions of two originals. This image reader has an attribute memory having a data region smaller than that of such an image memory. For example, attributes of an image for small sections such as bi-level or half-tone are stored in the data region. Various editing operations are performed in real time based on the attribute data. However, this monochrome image reader is not capable of composing more than two images.

A color image editing apparatus is disclosed in Japanese Patent Laying-Open Gazette (Kokai) No. 58-60875. In this apparatus, an area of an original is designated by a loop of a specified color and by reading the original, editing operations designated such as masking or transformation of black and red colors for the specified area and the area outside the specified area are performed. However, this apparatus is not capable of performing complicated editing operations such as editions different for each area. This apparatus is not capable of forming composite color images either.

OBJECTS AND SUMMARY OF THE INVENTION

Therefore, an object of the present invention is to provide an image reading and editing apparatus capable of forming a composite image without using an image memory covering an entire image region of an original.

Another object of the present invention is to provide an image reading and editing apparatus capable of forming an composite image in real time without using such an image memory as described above.

A further object of the present invention is to provide an image reading and editing apparatus capable of forming a composite color image without using such an image memory as described above.

The above described objects of the present invention can be attained by using an attribute memory having a capacity smaller than that of the above described image memory and composing image data read out based on attribute data of images written in the attribute memory.

Briefly stated, an image reading and editing apparatus of the present invention comprises an image signal reading means for reading an image signal concerning a light intensity, an attribute memory for storing data for defining an attribute of an image for each small section by which an entire image region is divided, attribute data setting means for designating an arbitrary small area out of the entire image region and setting attribute data for each of the small sections, and output means for outputting an image signal based on the stored attribute data.

The image reading and editing apparatus of the present invention thus constructed makes it possible to form a composite image without using the prior art described image memory covering an entire image region of an original.

In a preferred embodiment of the present invention, the image reading and editing apparatus comprises image signal reading means for reading an image signal concerning a light intensity for each red, green and blue color, means for dividing an original image into small areas each defined by a specified attribute, means for designating for each of the above mentioned areas an attribute signal including a prohibition attribute signal for prohibiting change of attributes, and an attribute memory for storing an attribute of the image for each predetermined small section by which the entire image region is divided, whereby two or more images are composed to form a composite image by using the prohibition attribute stored in the attribute memory. If a foreground image is to be formed on a background image for example, the prohibition attribute performs the following function. The prohibition attribute is set for the background image other than the partial image of the foreground to be formed, so that the background image can be prevented from being changed at the time of forming the foreground image on the background image.

The image reading and editing apparatus thus constructed makes it possible to form a composite color image in real time.

These objects and other objects, features, aspects and advantages of the present invention will become more apparent from the following detailed description of the present invention when taken in conjunction with the accompanying drawings.

DESCRIPTION OF THE PREFERRED EMBODIMENTS

In the description of the present invention, the U.S. patent application Ser. No. 883,135 entitled "Image Processor" filed July 8, 1986, now abandoned is incorporated by reference.

An image reading and editing apparatus in accordance with the present invention comprises an image reader for reading an image, an attribute memory for storing attributes of specified areas of the image, designation means for designating any of the specified areas and the attribute thereof, and an image data processing circuit.

A method for forming a composite image in accordance with the present invention comprises a step of reading a first image and a second image to be composed. The first image and the second image are in either of the following two relations. In the first relation, the first image is a foreground image and the second image is a background image. In the second relation, the first image is a background image and the second image is a foreground image.

Accordingly, an embodiment of the present invention will be described in the following order.

1. Construction of the Embodiment
   (a) Image reader
   (b) Attribute memory
   (c) Designation of an area and an attribute
   (d) Image data processing circuit
2. Composite image forming operation
   (a) Composite image formation in the order a foreground image to a background image
   (b) Composite image formation in the order a background image to a foreground image

1. Construction of the Embodiment

(a) Image reader

The image reader of the image reading and editing apparatus of the preferred embodiment will be described with reference to FIG. 1.

Light emitted from a halogen lamp 2 as a light source for exposure is applied to an original 102 on an original glass table 101. The light reflected from the original enters, through an optical system (not shown), a charge-coupled device 1 (hereinafter referred to as CCD) provided as an array perpendicular to an image projecting direction. The CCD 1 comprises filters for selectively transmitting any one of three colors red, green and blue for each pixel. A signal representing the intensity of the reflected light for each of the three colors separated by the CCD 1 is outputted.

Figure 4:
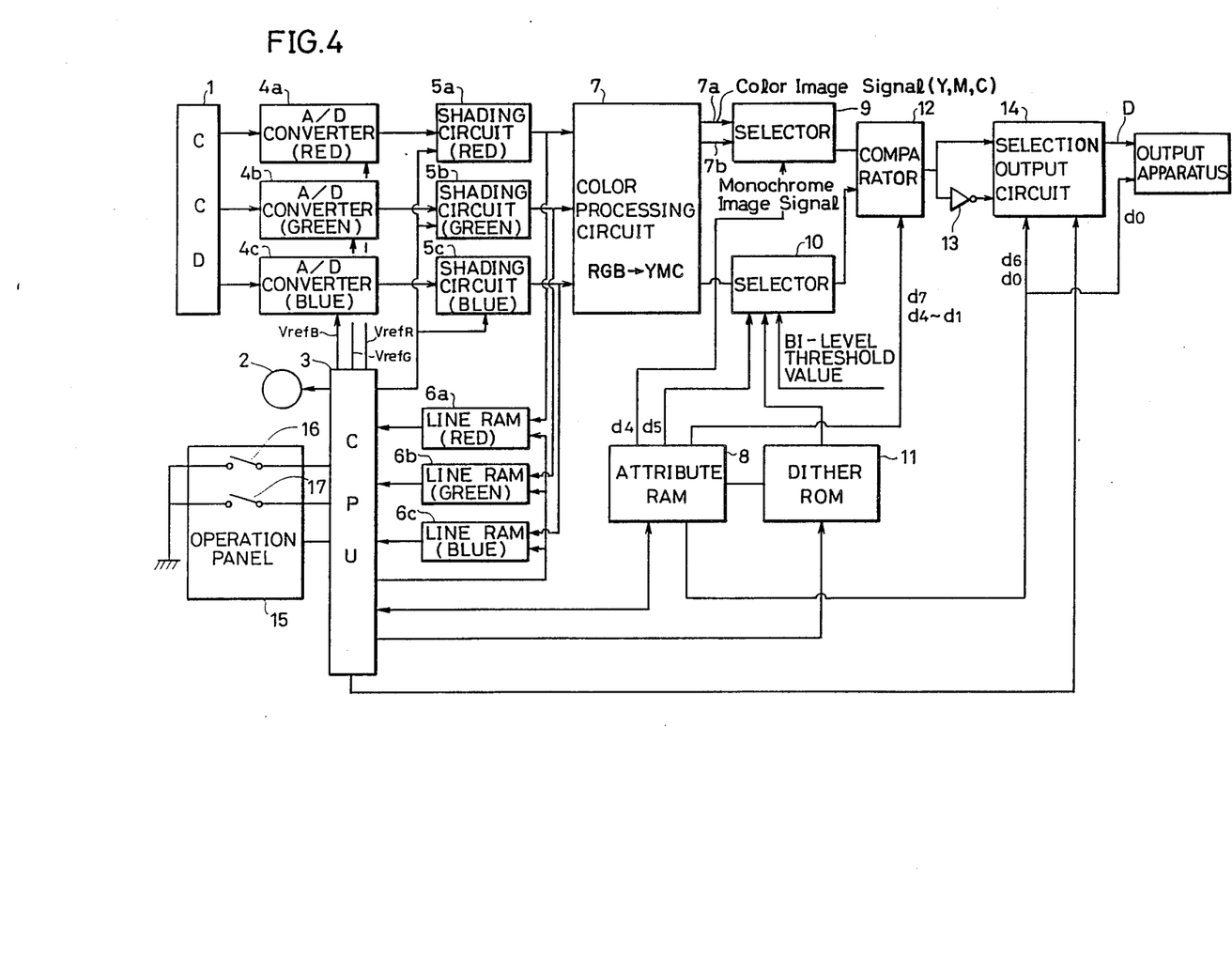
FIG. 4 is a block diagram showing a processing circuit of the image reading and editing apparatus in accordance with the present invention.

The halogen lamp 2, the optical system and the CCD 1 constitute a unit. This unit is moved by a drive system (not shown) in a direction shown by arrow a predetermined distance along the glass table 101. Thus, the original 102 is scanned. The drive system may be controlled by a central processing unit 3 (CPU), such as shown in FIG. 4 or another CPU.

A reference white plate 103 is provided on the glass table 101, outside the original region.

Thus, color signal information concerning the original 102 is obtained. The color signal information is outputted through a processing circuit having a construction as shown in FIG. 4 to a color printer having a printing medium, a memory device or the like.

(b) Attribute memory

The image reading and editing apparatus of this embodiment comprises an attribute memory having capacities corresponding to small sections (for example, each section having a unit square area of 1 mm$^2$) by which an image region for one page is divided. Each attribute of an image corresponding to each small section is written in the attribute memory. A total capacity of this attribute memory is very small compared with that of an image memory for storing data for each pixel of an image in a conventional apparatus.

Attribute data written in the attribute memory is composed of eight bits d7 to d0. Each bit represents attribute information shown in Table 1. More specifically, the bit d7 instructs single-color painting. The bit d6 instructs inversion of an output signal. The bit d5 instructs bi-level processing or dither processing dependent on a color density of a pixel read out. The bit d4 gives an instruction as to whether printing is to be performed in a monochrome mode or not. The bits d3 to d1 instruct color designation concerning d7 and d4, corresponding to colors as shown in Table 2. The bit d0 presents a request to an output apparatus for prohibition of printing on the printing medium.

TABLE 1

| Attribute Information (corresponding to 0/1) | |
|---|---|
| d7: | invalid pixel/valid pixel |
| d6: | reversal/non-reversal |
| d5: | bi-level/dither |
| d4: | fixed color/multicolor |
| d3: | |
| d2: | color codes (see Table 2) |
| d1: | |
| d0: | prohibition of output/output |

TABLE 2

| Designation of Single Colors (color codes) | | | |
|---|---|---|---|
| d3 | d2 | d1 | designated color |
| 0 | 0 | 0 | white |
| 0 | 0 | 1 | yellow |
| 0 | 1 | 0 | magenta |
| 0 | 1 | 1 | red |
| 1 | 0 | 0 | cyan |
| 1 | 0 | 1 | green |
| 1 | 1 | 0 | blue |
| 1 | 1 | 1 | black |

Using the above described attribute memory, image editing operations such as masking, trimming, edition in the monochrome mode of a designated color and edition in a full color half-tone mode can be performed. An example an image editing operation will be described referring to FIGS. 2 and 3.

Figure 2:
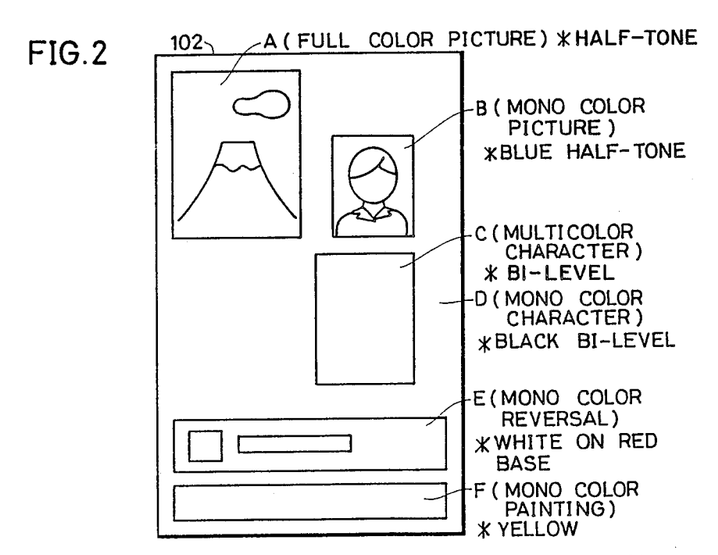
FIG. 2 is an illustration showing an original having plural image areas to be processed, each in a different manner, and contents for processing.

Let us assume that a color original as shown in FIG. 2 is read. Processing as described below is requested for the respective areas A to F to provide outputs.

The area A is a full color half-tone area.

The area B is a single color half-tone area. In this example, blue is designated. Accordingly, even if this area in the original is a full color picture portion, this area is reproduced in a blue color half-tone.

The area C is a multicolor character area. For this area, any one of the eight colors shown by the color codes is selected for each pixel. This processing is effective for reproduction of multicolor character portions The area D is a single color character area. In this example, black is selected as the designated color.

The area E is an area where white characters are to be reproduced on the designated base color. In this example, red is selected as the base color.

The area F is an area to be painted out by a designated color. Yellow is designated in this example.

Figure 3:
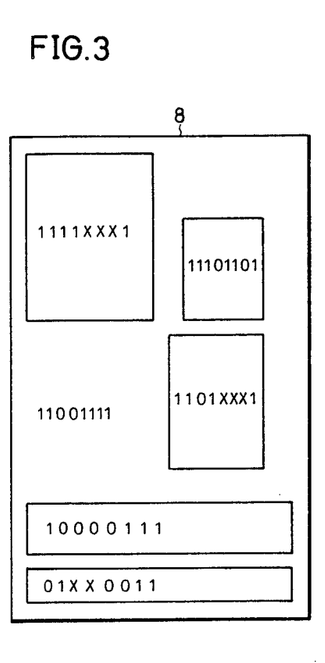
FIG. 3 is an illustration showing attribute data corresponding to the areas shown in FIG. 2.

In this example, data as shown in FIG. 3 are written in the attribute memory.

In order to output the data, processing is performed corresponding to the data of the attribute memory for each unit square area of 1 mm$^2$, as will be described afterwards. For example, full color half-tone processing is applied to the area A and bi-level processing is applied to the area D.

(c) Designation of an area and an attribute

Attributes for image edition are designated through an operation panel 15 (FIG. 4). Attribute data are stored in the attribute memory through the CPU 3. On the other hand, an output signal is obtained from a color signal provided from the CCD 1.

Designation of an image area and designation of an attribute may be effected as disclosed in U.S. patent application Ser. No. 883,135. According to this U.S. application, an entire region of an image is read at first. The thus read image is represented on a display. An attribute is inputted by moving a cursor on the display using a keyboard. A specified area is designated by specifying x and y coordinates. An attribute may be set for the thus designated area.

(d) Image data processing circuit

Referring to FIG. 4, the circuit for processing the image data read out by the CCD 1 will be described.

Figure 1:
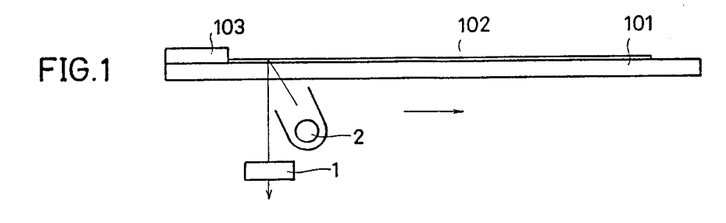
FIG. 1 is a sectional view of an image reading portion of a color image reading and editing apparatus in accordance with the present invention.

First, an output corresponding to the reference white plate 103 outside the original region shown in FIG. 1 is obtained through the CCD 1. At the same time, an image signal is written in line RAM's 6a, 6b and 6c in response to an instruction of the CPU 3. The CPU 3 checks the written content. Then, reference voltages VrefR, VrefG and VrefB for analog-to-digital (A/D) converters 4a, 4b and 4c, respectively, are set so that the maximum values of the signal may be constant for the respective colors of red (R), green (G) and blue (B).

After the reference voltages VrefR, VrefG and VrefB have been set, the data written in the line RAM's 6a, 6b and 6c are maintained as reference data for shading correction. When the original region begins to be scanned, the CPU 3 sets an exposure amount for the halogen lamp 2, based on the exposure amount data preset through the operation panel 15. Signals of the respective colors subjected to exposure of the preset amount are converted to digital values by the A/D converters 4a, 4b and 4c, respectively. The respective color signals thus converted as the digital values are inputted to a color processing circuit 7 after shading correction processing in shading circuits 5a, 5b and 5c. Masking correction processing is performed by the color processing circuit 7 corresponding to characteristics of ink for an output apparatus. Then, signals Y, M and C (corresponding to the colors R, G and B, respectively) are generated by this circuit 7. The characters Y, M and C represent yellow, magenta and cyan, respectively. If the output apparatus is a printer for printing a region of one page for each color, the below described method will be effectively utilized to decrease a memory capacity of the output apparatus. More specifically, scanning is repeated by the number of colors to be printed and a necessary output signal (any of the signals Y, M and C) is outputted for each scanning. (In this case, the printer produces outputs in the above described manner. If the respective colors Y, M and C are to be obtained simultaneously, a printer is provided in a manner in which circuits downstream of the color processing circuit are provided in parallel corresponding to the number of colors to be printed. Thus, there is substantially no limitation as to the printing method.

Any of the output signals Y, M and C of the color processing circuit 7 is shown as a color image signal 7a in FIG. 4. A color density average (or a weighted color density average) of the colors R, G and B is calculated and outputted as a monochrome image signal 7b. The color density average corresponds to a density signal in a case where the original image is processed as monochrome data. The color image signal 7a and the monochrome image signal 7b are inputted to a selector 9.

The bit d4 out of the attribute data on the position corresponding to a present original reading position is supplied to the selector 9 as a select signal. In the case of d4=φ, the monochrome image signal 7b is transmitted downstream. In the case of d4=1, the color image signal 7a is transmitted downstream.

A dither ROM 11 generates a half-tone threshold value with a cycle corresponding to a matrix of m×n. A selector 10 selects either data from the dither ROM 11 or bi-level threshold data in response to the bit d5 of the attribute data. Then, the selected data is transmitted to a comparator 12. The comparator 12 compares the signal (i.e., the image signal) from the selector 9 and the signal (i.e., the threshold data) from the selector 10. The bits d7 and d4 to d1 are inputted to the comparator 12 as control signals. An output of the comparator 12 is as follows.

①  In the case of d7=φ and d4=φ or 1, the output of the comparator 12 is always a constant value according to the color codes. As a result, a designated area is painted out by a single color. If d1=1 when scanning is effected to obtain the signal Y (Yellow) for example, the output of the comparator 12 is 1 irrespective of the image signal. If d1=φ, the output is φ.

②  In the case of d7=1 and d4=φ, the output of the comparator 12 is as follows. If the bit of the color code concerning the printing color of the scanned object is 1, the output of the comparator 12 is 1. If the bit of the color code is φ, the output of the comparator 12 is φ.

③  In the case of d7=1 and d4=1, the comparator 12 outputs the comparison result between the image signal and the threshold signal as it is.

Data from the comparator 12 is supplied to a selective output circuit 14 directly and also through an inverter 13. The selection output circuit 14 outputs data inverted or non-inverted dependent on the bit d6 to the output apparatus such as the printer and the memory device. In this case, the output is supplied in synchronism with valid pixel signals from the CPU 3.

Figure 5:
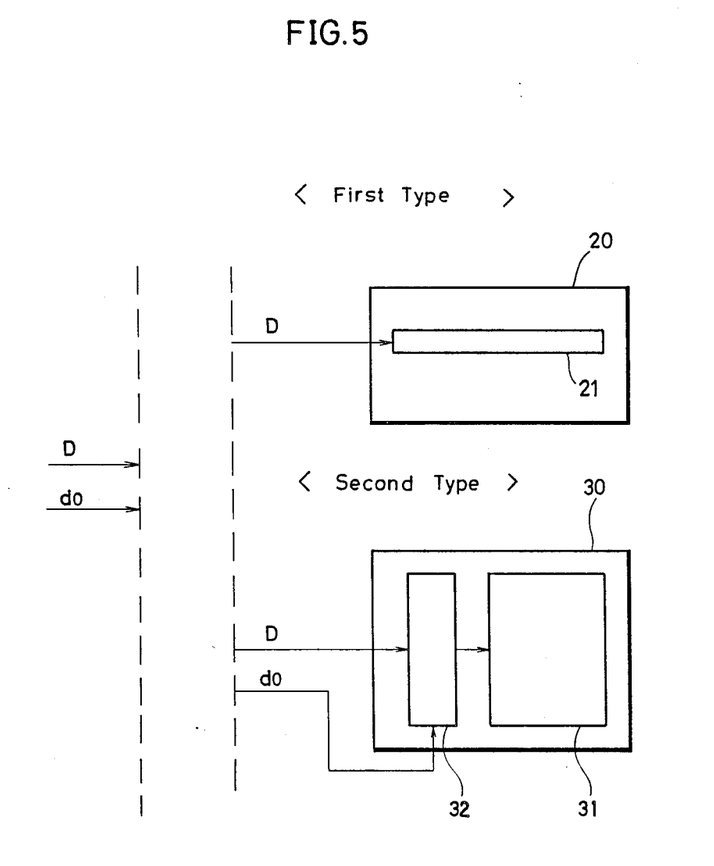
FIG. 5 is a typical view showing an output apparatus for receiving image data processed in the processing circuit of FIG. 4.

FIG. 5 is a schematic view showing the output apparatus for receiving the data (i.e., the image data D and the attribute data d0) from the processing circuit shown in FIG. 4. There are two types of output apparatus which can be connected to the image reading and editing apparatus of the present invention. An output apparatus 20 of the first type includes an output memory 21 having a capacity for storing data of only one line or several lines of one page. This output apparatus 20 performs printing for each line whenever it receives the data. An example of the output apparatus of this first type is a color printer of a thermal transfer type. Such an output apparatus prints all the image data obtained by a first reading operation. Then, it prints, on the printed paper, data obtained by a second reading operation. Consequently, if the first image extends over an area where the second image is to be printed, overlap of the images will occur. To prevent such overlap, the entire image data D is previously processed by using the prohibition attribute in the attribute memory and then supplied to the output apparatus 20, as will be described in detail afterwards.

An output apparatus 30 of the second type includes a buffer memory 31 having a capacity for storing image data for one page. This output apparatus 30 performs printing after a plurality of images are composed as a composite image in the buffer memory 31. The image data D and the attribute data d0 are supplied to this output apparatus 30. Both data are inputted to a memory writing control circuit 32 provided in the preceding stage of the buffer memory 31. The memory writing control circuit 32 stops writing the image data in the memory 31 when the attribute data d0 is 0.

2. Composite image forming operation

In the following, an example for forming a composite image c by joining two images of originals a and b will be described.

Systems for forming a composite image include two systems: one is a system (system A) for composite image formation in the order foreground image to a background image, and the other is a system (system B) for composite image formation in the order from a background image to a foreground image. System A is applicable to output apparatus of the first and second types, while the system B is only applicable to output apparatus of the second type.

(a) Composite image formation in the order from a foreground image to a background image (system A).

Figure 6:
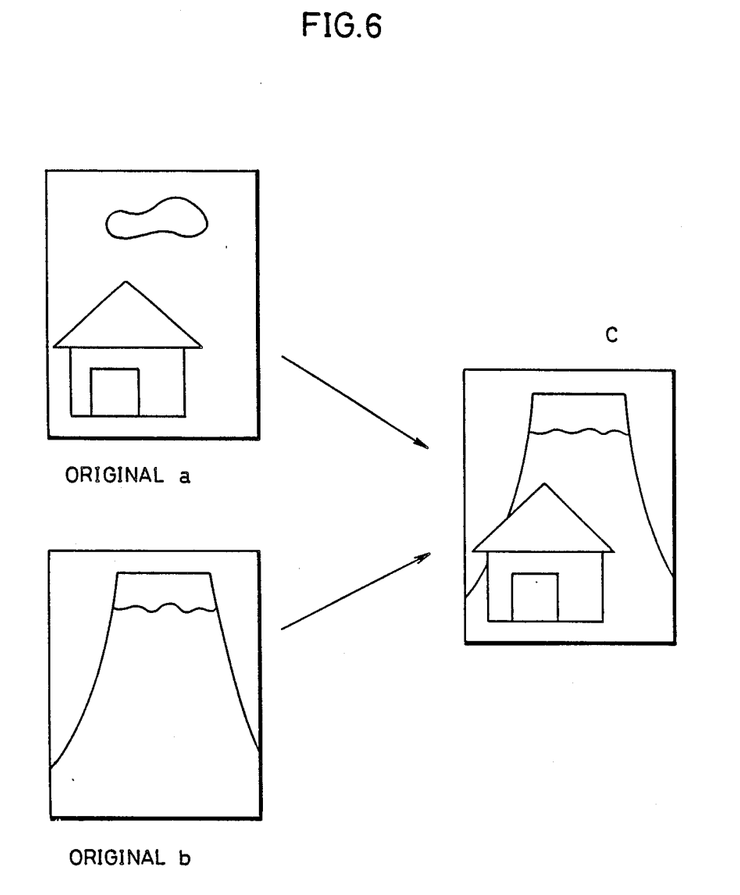
FIG. 6 is an illustration for explaining a principle of composite image formation.
Figure 7:
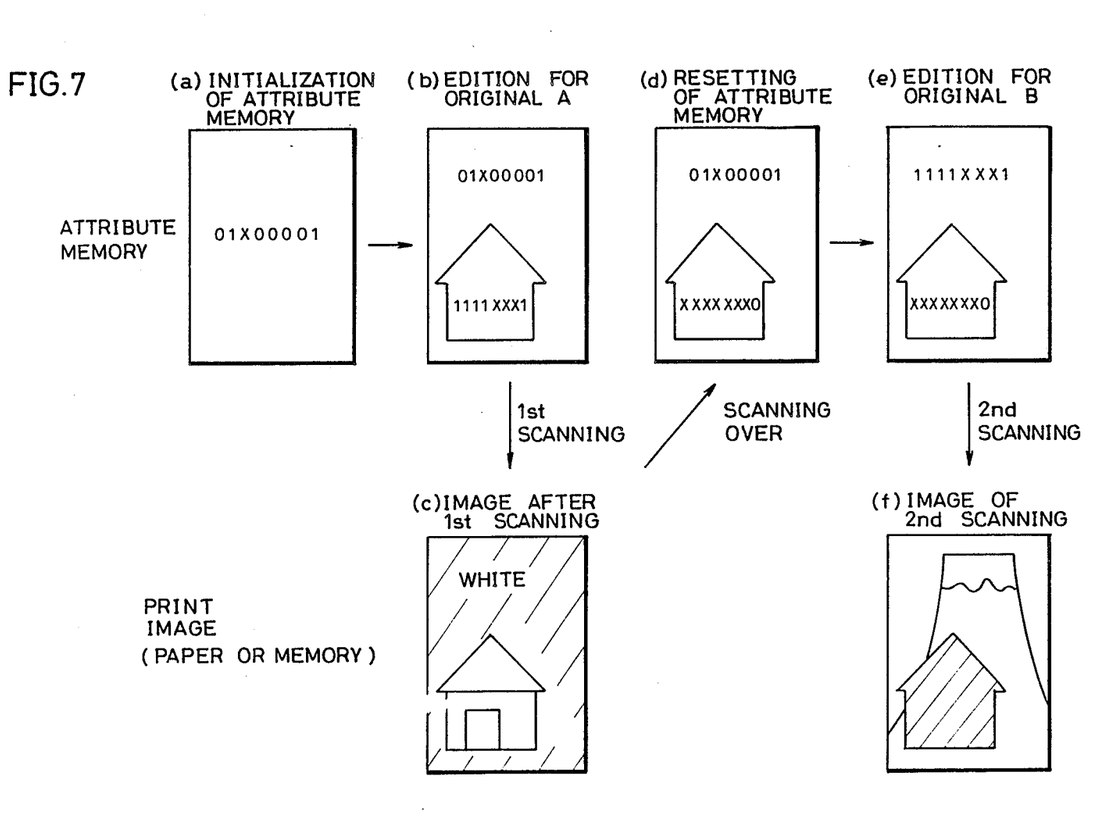
FIG. 7 is a schematic view showing a process of forming a composite image and moving an image from a foreground to a background.
Figure 8A:
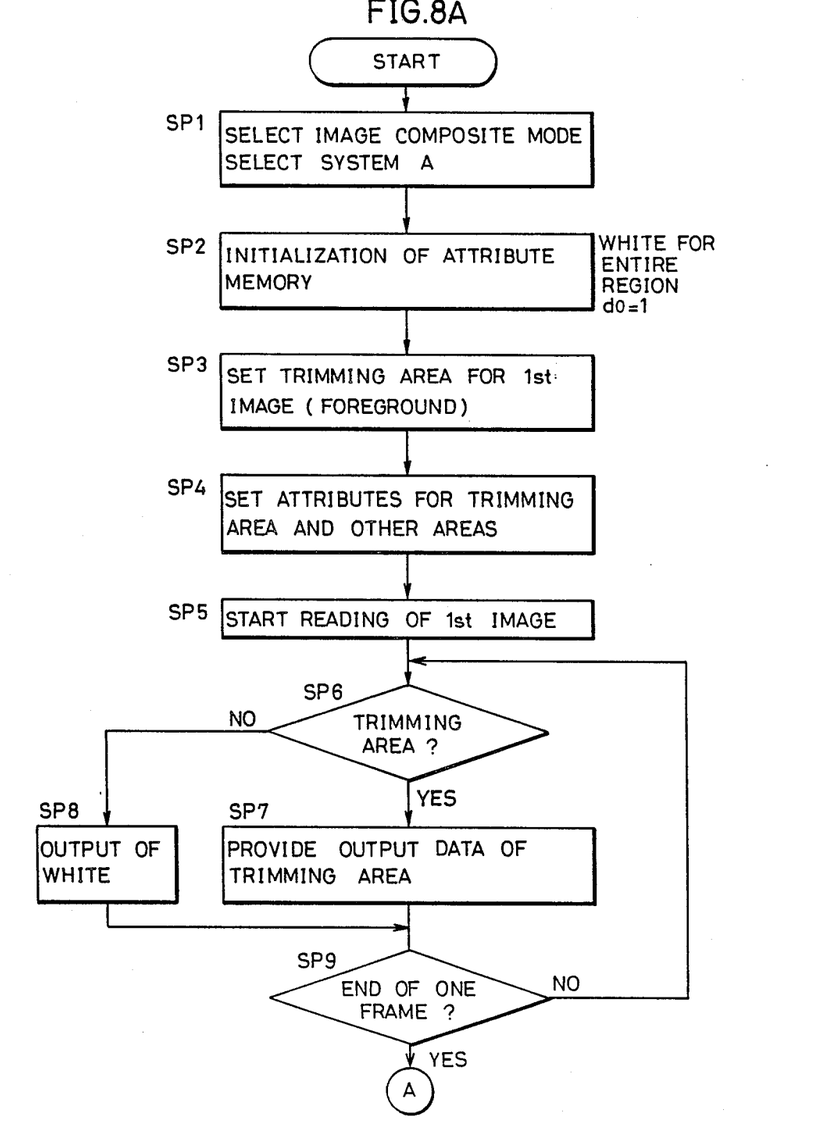
FIGS. 8A and 8B are a flow chart for the case of FIG. 7.
Figure 8B:
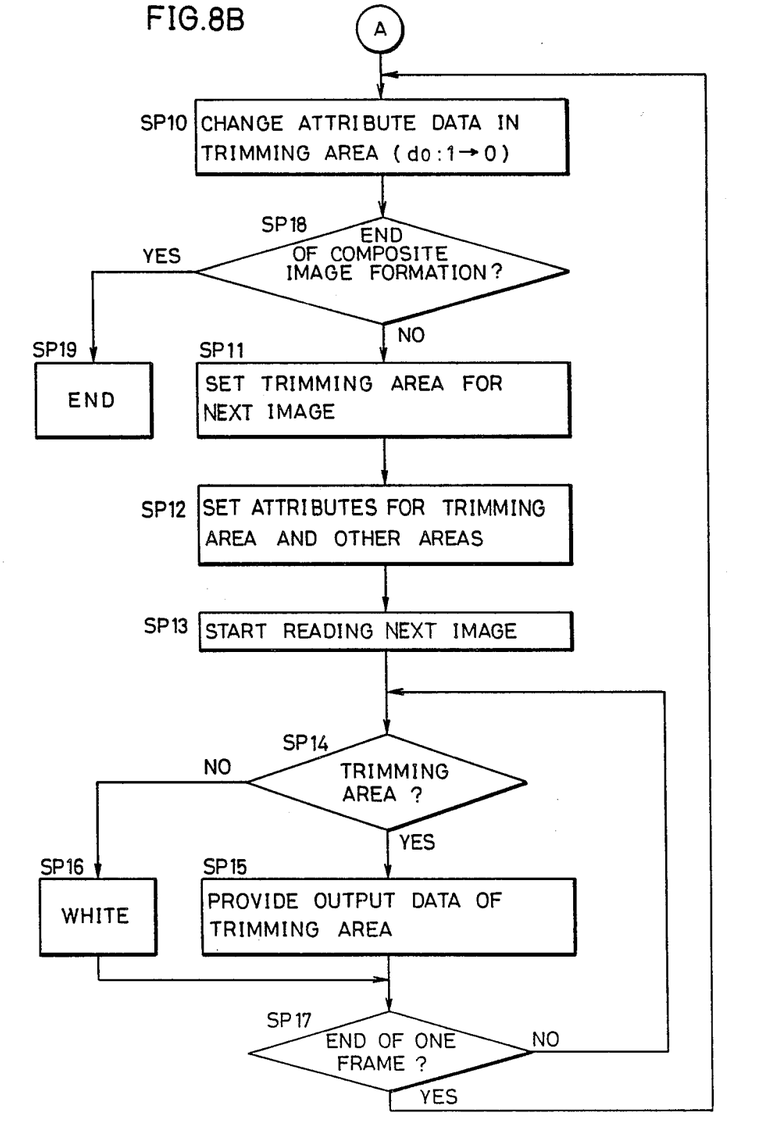

Referring to FIGS. 7 and 8, composite image formation by system A will be described. To select the system A, a composite mode switch 16 (FIG. 4) is turned on and a selection switch 17 (FIG. 4) is turned off (in step SP1, see FIGS. 8A and 8B). The CPU 3 initializes the attribute memory 8. In this case, initialization is set to "white" and d0=1 for the entire region, as shown in part (a) of FIG. 7 (in step SP2). Subsequently, data is inputted from the operation panel 15 including adequate input means (not shown). With regard to the first original image (the foreground image) a, a trimming area is set (in step SP3) and attributes are set for the area and the other area outside the trimming area (in steps SP4). In case of FIG. 7, the house portion of the original image a is set to a half-tone full color (1111xxx1). Attribute data (01x00001) remains for the area outside the trimming area. Subsequently, scanning for reading the data is performed (in steps SP5 and SP6) and the image data is outputted to the output apparatus (in steps SP7 and SP8). In the case of FIG. 7, the color code of the image in the area outside the trimming area is white (d3=d2=d1=0). Thus, the image in the area outside the trimming area, formed by the output apparatus is in white (as shown in part (c) of FIG. 7) (in step SP8). After the scanning for one page is completed (step SP9), the attribute d0 in the portion corresponding to d0=1 and the non-white color codes, that is, in the trimming area is changed from 1 to $\phi$ (in step SP10). Subsequently, with regard to the second original image (the background image) b, a trimming area and an attribute are set (in steps SP11 and SP12). At this time, the CPU 3 does not change the data in the attribute memory 8 for the area set to d0=$\phi$, that is, the trimming area of the first original. In other words, it is not necessary in this second edition to take account of the area where the first image has been formed. For example, if the entire region of the original image b is set to half-tone full color, a content in the attribute memory 8 is set as shown in part (e) of FIG. 7. In this condition, scanning operation is performed on the same printing medium as that where the first image has been formed (in steps SP13 to SP17). Then, the image as shown in part (f) of FIG. 7 is formed. As a result, the composite image c as shown in FIG. 6 is obtained.

In the second scanning operation, even if image data exists in the area corresponding to the trimming area of the first original, such image data is not outputted. This is because the attribute data d0 in this area is $\phi$ and output of such image data from the selection output circuit 14 is prohibited.

In this example, the attribute data d0 becomes $\phi$ for the entire region of the attribute memory 8 after the end of the second scanning operation (in step SP10). However, if a color area ($\phi$1x$\phi\phi\phi$1) remains, composite image formation can be performed by a non-limited number of times by repeating the same trimming in the editing operations subsequent to the second editing operation (in steps SP18).

To bring the composite mode in this system A to an end, the composite mode switch 16 is turned off (in steps SP18 and SP19).

Next, composite image formation of using an output apparatus including a buffer memory to enable overlap printing will be described, using the output apparatus of the second type. In the output apparatus of the second type (hereinafter referred to as the output memory device), if the color white (i.e., the image data d3, d2, d1=$\phi$) is written in the area where an image has been written, the data in this area will be rewritten in white. Accordingly, the above described system cannot be directly applied in this case. Therefore, the attribute data d0 as well as the image data D is outputted to the output memory device as shown in FIG. 5. The writing control circuit 32 of the output memory device writes the image data in memory if d0=1. On the other hand, if d0=$\phi$, the writing control circuit 32 prohibits writing in the memory device and the previously written data is maintained.

The other procedures are the same as described above in the case of using paper as the printing medium.

(b) Composite image formation in the order from a background image to a foreground image (system B).

In the above described system A, printing operation is performed in the order foreground image to the background image. On the other hand, in the case of the memory device (including the buffer memory) where information written afterwards becomes valid by repeating writing operations, the system B can be adopted to form a composite image in the order background image to the foreground image.

Figure 9:
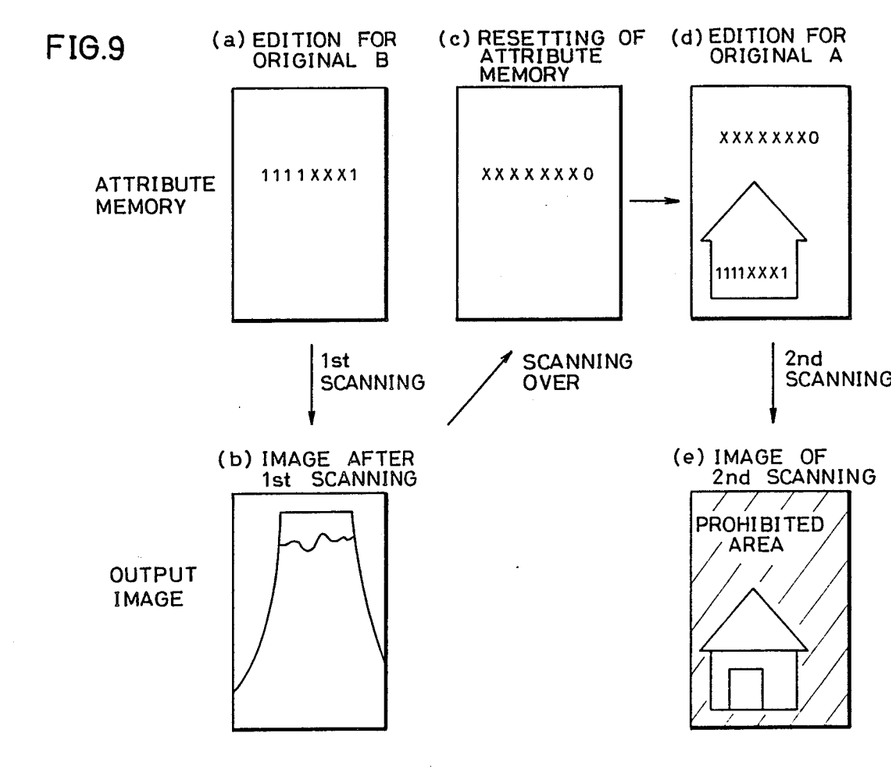
FIG. 9 is a schematic view showing a process of forming a composite image and moving an image from a background to a foreground.
Figure 10A:
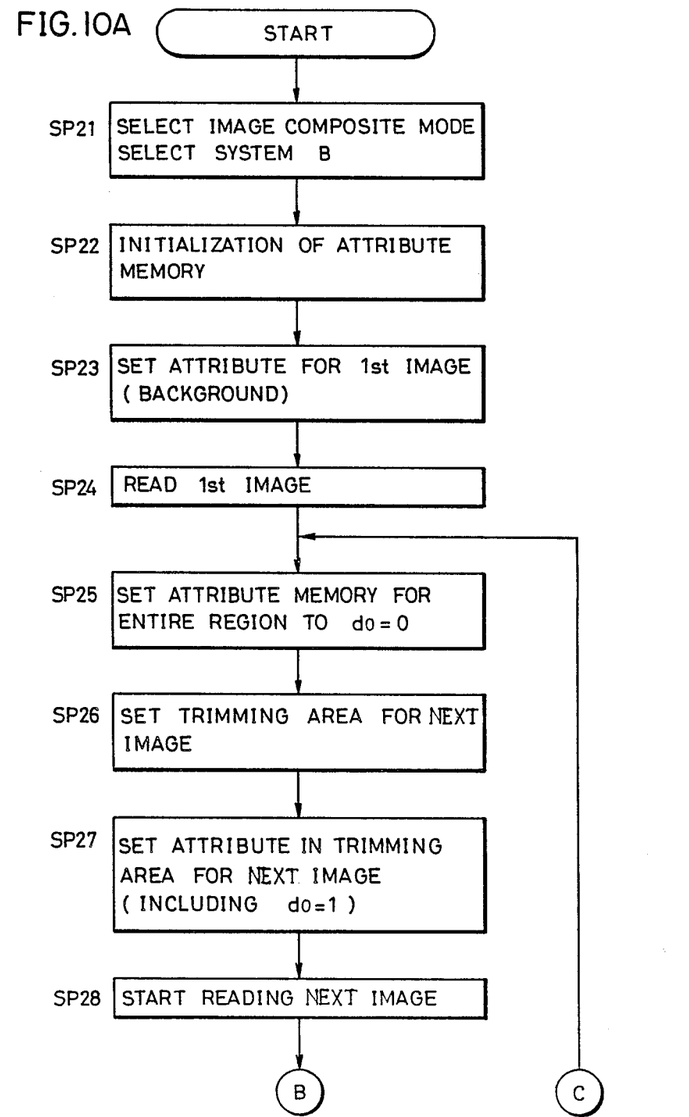
FIGS. 10A and 10B are a flow chart for the case of FIG. 9.
Figure 10B:
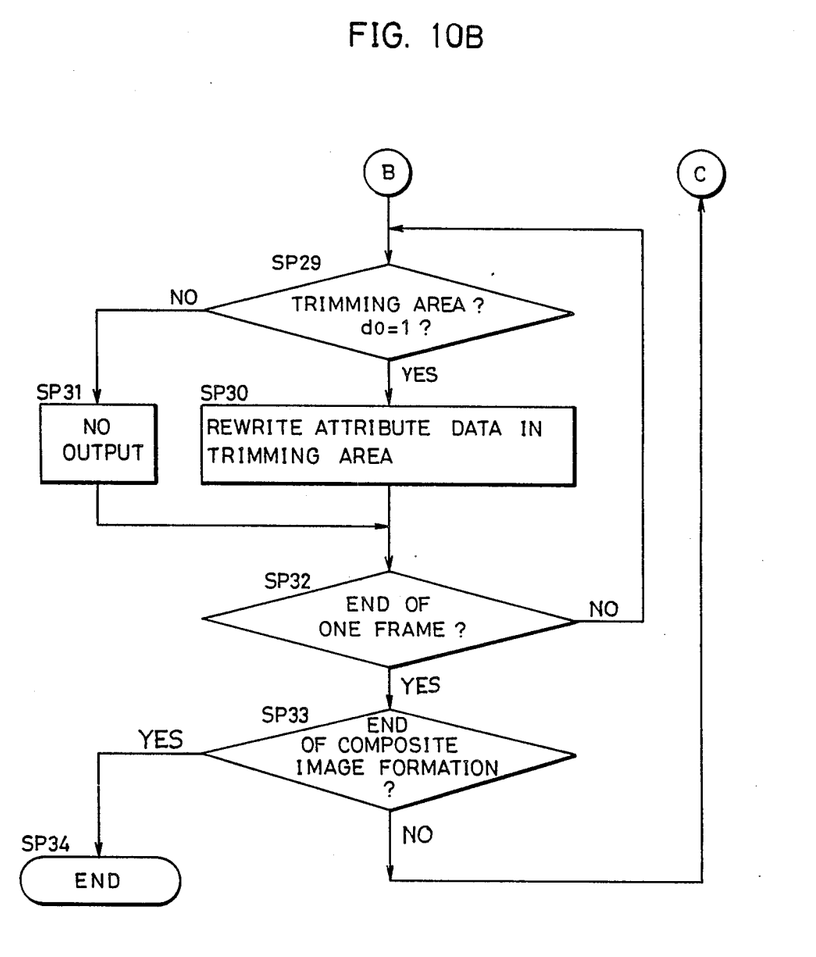

Referring now to FIGS. 9 and 10, this system will be described. This system B is selected when the switch 17 (FIG. 4) is turned on (in step SP21, see FIGS. 10A and 10B). The switch 16 (FIG. 4) has of course been turned on. Thus, the flow shown in FIG. 10 is started.

The attribute data for the entire region is initialized to $\phi$ (in step SP22). Then, attribute data for the original image (the background image) b is set by the CPU 3 through the operation panel 15 having adequate input means (in step SP 23) as shown in part (a) of FIG. 9. In this case, the entire region is of the half-tone (1111xxxb 1). If scanning operation is performed in this state, the background image as shown in part (b) of FIG. 9 is formed in the memory (in step SP24).

After the scanning operation, the content of the attribute memory 8 for the entire region is automatically set to $d0=\phi$ (prohibition of printing) as shown in part (c) of FIG. 9 (in the step SP25). Subsequently, trimming is effected for the original image a (in step SP26). At this time, even if $d0=\phi$, the content of the attribute memory 8 can be rewritten. The CPU 3 sets all the attribute data d0 within the trimming area to 1 (in step SP27). Thus, the attribute memory 8 is set for the original image a as shown in part (d) of FIG. 9. More specifically, the trimming area has $d0=1$ and is set to a suitable attribute mode (half-tone in this case). In this state of the attribute memory 8, scanning operation is performed for the original image a (in steps SP28 and SP29). The data d0 is also transmitted to the printer in synchronism with the output of the image data. If $d0=1$, the printer outputs the image data in a manner overlapping with the image data shown in part (b) of FIG. 9 (in the steps SP30 and SP31). Thus, the image is written as shown in part (e) of FIG. 9. On the other hand, if $d0=\phi$, writing of the data is prohibited. Thus, the composite image c composed of the original images a and b as shown in FIG. 6 is formed.

In this case also, composite image formation can be performed by a non-limited number of times by repeating the above described editing operations.

To bring the composite mode in this system B to an end, the composite mode switch 16 is turned off.

Although the present invention has been described and illustrated in detail, it is clearly understood that the same is by way of illustration and example only and is not to be taken by way of limitation, the scope of the present invention being limited only by the terms of the appended claims.

What is claimed is:

1. An image reading and editing apparatus, comprising:
    image reading means for reading an image on an original and generating image data;
    attribute data storing means for storing attribute data representing how the image data is to be processed, said attribute data being set for each of a plurality of small sections into which the entire region of the original containing said image is divided, said attribute data including a prohibition attribute;
    attribute data input means for designating an area equal to or larger than one of said small sections in the entire region of the original, setting attribute data for the designated area, and storing the attribute data in the attribute data storing means;
    means for instructing that a composite image is to be formed from two or more image portions on areas designated in different originals by the attribute data input means; and
    image data output means for processing the image data generated by said image reading means based on the attribute data stored in said attribute data storing means and outputting the processed image data to an external apparatus so that null data is output with respect to small sections for which the prohibition attribute is set when said instructing means instructs that a composite image is to be formed.

2. An image reading and editing apparatus in accordance with claim 1, wherein said image reading means comprises color image reading means for reading a color image and generating image data for each of three primary colors and said attribute data further includes a color code attribute.

3. An image reading and editing apparatus in accordance with claim 1, wherein said two or more image portions includes a foreground image portion on an area designated in one of original by said attribute data input means and a background image portion on an area designated in another original by said attribute data input means.

4. An image reading and editing apparatus in accordance with claim 3, further comprising selection means for selecting either a first output mode in which first image data according to said foreground image portion is generated and output and then second image data according to said background image portion is generated and output, or a second output mode in which the second image data is generated and output and then the first image data is generated and output.

5. An image reading and editing apparatus in accordance to claim 4, wherein said image data output means comprises control means for setting the prohibition attribute in said attribute data storing means for the designated area corresponding to said foreground image portion after output of the first image data when said first output mode is selected, whereby output of the second image data does not influence the first image data.

6. An image reading and editing apparatus in accordance with claim 4, wherein said image data output means comprises control means for setting the prohibition attribute in said attribute data storing means for areas other than the designated area corresponding to said foreground image portion after output of the second image data when said second output mode is selected, whereby output of the first image data does not influence the second image data.

7. An image reading and editing apparatus in accordance with claim 6, wherein said control means sets the prohibition attribute in said attribute data storing means for the entire region and then sets the attribute data for the designated area corresponding to said foreground image portion after output of the second image data.

8. An image reading and editing apparatus, comprising:
- image reading means for reading an image on an original and generating image data according to said image;
- attribute data storing means for storing attribute data representing how the image data is to be processed, said attribute data being set for each of a plurality of small sections into which the entire region of the original containing said image is divided, said attribute data including a prohibition attribute;
- attribute data input means for designating an area equal to or larger than one of said small sections in the entire region of the original, setting attribute data for the designated area, and storing the attribute data in the attribute data storing data;
- means for instructing that a composite image is to be formed two or more image portions on areas designated in different originals by the attribute data input means; and
- image data output means for processing the image data generated by said image reading means based on the attribute data stored in the attribute data storing means and outputting the processed image data together with the prohibition attribute to an external apparatus when said instructing means instructs that a composite image is to be formed;
- said external apparatus having a buffer memory to store the processed image data therein and means for writing the processed image data into the buffer memory based on the prohibition attribute.

9. An image reading and editing apparatus in accordance with claim 8, wherein said image reading means comprises color image reading means for reading a color image and generating image data for each of three primary colors and said attribute data further includes a color code attribute.

10. An image reading and editing apparatus in accordance with claim 8, wherein said two or more image portions includes a foreground image portion on an area designated in one original by said attribute data input means and a background image portion on an area designated in another original by said attribute data input means.

11. An image reading and editing apparatus in accordance with claim 10, further comprising selection means for selecting either a first output mode in which first image data according to said foreground image portion is generated and output and then second image data according to said background image portion is generated and output, or a second output mode in which the second image data is generated and output and then the first image data is generated and output.

12. An image reading and editing apparatus in accordance with claim 11, wherein said image data output means comprises control means for setting the prohibition attribute in said attribute data storing means for the designated area corresponding to said foreground image portion after output of the first image data when said first output mode is selected, whereby output of the second image data does not influence the first image data.

13. An image reading and editing apparatus in accordance with claim 11, wherein said image data output means comprises control means for setting the prohibition attribute in said attribute data storing means for areas other than the designated area corresponding to said foreground image portion after output of the second image data when said second output mode is selected, whereby output of the first image data does not influence the second image data.

14. An image reading and editing apparatus in accordance with claim 13, wherein said control means sets the prohibition attribute in said attribute data storing means for the entire region and then sets the attribute data for the designated area corresponding to said foreground image portion after output of the second image data.

15. An image reading and editing method for processing image data corresponding to first and second image portions in different originals and outputting the processed image data to an external output apparatus by using an image reading apparatus, the image reading apparatus comprising image reading means for generating image data corresponding to each original, attribute data storing means for storing attribute data for representing how the image data is to be processed, said attribute data being set for each of a plurality of small sections into which the entire region of each original is divided, attribute data input means for designating arbitrary small areas each equal to or larger than one of said small sections in said entire region, setting attribute data for each of said small areas, and storing the attribute data in the attribute data storing means, and image data output means for processing the image data generated by said image reading means based on the attribute data stored in said attribute data storing means and outputting the processed image data, said method comprising the steps of:

- designating an area corresponding to the first image portion and setting attribute data for the same in said attribute data storing means such that a white attribute representing a white color is set for areas other than the area corresponding to the first image portion in said attribute data storing means;
- outputting first image data corresponding to said first image portion to said external apparatus by using said image reading means and said image data output means;
- setting attribute data for an area corresponding to the second image portion in said attribute data storing means while setting a prohibition attribute for prohibiting output of image data for the area corresponding to the first image portion, and
- outputting second image data corresponding to said second image portion to said external apparatus by using said image reading means and said image data output means, whereby said first image portion is combined with said second image portion to form a composite image by using said external output apparatus.

16. An image reading and editing method for processing image data corresponding to first and second image portions in different originals and outputting the processed image data to an external output apparatus having a buffer memory for storing image data by using an image reading apparatus, the image reading apparatus comprising image reading means for generating image data corresponding to each original, attribute data storing means for storing attribute data for representing how the image data is to be processed, said attribute data being set for each of a plurality of small sections into which the entire region of each original is dividend, attribute data input means for designating small areas each equal to or larger than one of said small sections in said entire region, setting attribute data for each of said small areas, and storing the attribute data in the attribute data storing means, and image data output means for processing the image data generated by said image reading means based on the attribute data stored in said attribute data storing means and outputting the processed image data, said method comprising the steps of:

setting attribute data for an area corresponding to the first image portion in said attribute data storing means;

outputting first image data corresponding to said first image portion to said external apparatus by using said image reading means and said image data output means;

designating an area corresponding to the second image portion, and setting attribute data for the same in said attribute data storing means while setting a prohibition attribute for prohibiting output of image data for areas other than the area corresponding to the second image portion, and outputting second image data according to said second image portion to said external apparatus by using said image reading means and said image data output means, whereby said second image portion is combined with said first image portion to form a composite image by using said external output apparatus.

* * * * *